(12) United States Patent
Davis (10) Patent No.: US 9,860,114 B2
(45) Date of Patent: Jan. 2, 2018

(54) RAPID PROVISIONING IN A DYNAMIC NETWORK ENVIRONMENT

(71) Applicant: Cisco Technology, Inc., San Jose, CA (US)

(72) Inventor: Jason C. Davis, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 14/674,521

(22) Filed: Mar. 31, 2015

(65) Prior Publication Data

US 2016/0294607 A1 Oct. 6, 2016

(51) Int. Cl.
G06F 15/173 (2006.01)
H04L 12/24 (2006.01)
H04L 12/46 (2006.01)

(52) U.S. Cl.
CPC .......... H04L 41/08 (2013.01); H04L 12/4641 (2013.01); H04L 41/04 (2013.01); H04L 41/0806 (2013.01); H04L 41/50 (2013.01)

(58) Field of Classification Search
CPC ..... H04L 41/04; H04L 41/08; H04L 41/0806; H04L 41/50; H04L 12/4641
See application file for complete search history.

(56) References Cited

U.S. PATENT DOCUMENTS

| 7,516,211 B1 | 4/2009 | Gourlay et al. |
| 8,462,666 B2 | 6/2013 | Subramanian et al. |
| 8,751,649 B2 | 6/2014 | Villait et al. |
| 2006/0274774 A1 | 12/2006 | Srinivasan et al. |
| 2009/0089431 A1* | 4/2009 | Kim ...................... H04L 63/164 709/226 |
| 2010/0165876 A1 | 7/2010 | Shukla et al. |
| 2010/0174820 A1* | 7/2010 | Banga .................. G06F 13/385 709/228 |
| 2010/0176962 A1* | 7/2010 | Yossef ................ H04L 12/2602 340/815.45 |
| 2011/0286360 A1 | 11/2011 | Melton et al. |

(Continued)

FOREIGN PATENT DOCUMENTS

| EP | 1376341 A2 | 1/2004 |
| EP | 2375690 A2 | 10/2011 |
| WO | 2005/081479 A1 | 9/2005 |

OTHER PUBLICATIONS

International Search Report and Written Opinion in corresponding International Application No. PCT/US2016/023574, dated May 25, 2016, 11 pages.

*Primary Examiner* — Charles C Jiang
*Assistant Examiner* — Ryan Kavleski
(74) *Attorney, Agent, or Firm* — Edell, Shapiro & Finnan, LLC (57) ABSTRACT

Processes and apparatus are presented for associating an endpoint connection with a port to which it is connected, and for allowing configuration of the port. A notification is received from a network device. The notification includes an identifier of a provisioning trigger device connected to an endpoint connection that is in communication with a port of the network device. The notification further includes an identifier of a port of the network device. Configuration information is sent to the network device, wherein the configuration information specifies how the network device is to configure the port for networking services.

20 Claims, 7 Drawing Sheets

(56) References Cited

U.S. PATENT DOCUMENTS

| | | | |
|---|---|---|---|
| 2013/0166774 A1 | 6/2013 | Pruthi et al. | |
| 2014/0244819 A1* | 8/2014 | Patrick | H04L 41/0806 709/223 |
| 2015/0109957 A1* | 4/2015 | Zhou | H04L 41/5051 370/254 |

* cited by examiner

RAPID PROVISIONING IN A DYNAMIC NETWORK ENVIRONMENT

TECHNICAL FIELD

The present disclosure relates to network configuration.

BACKGROUND

In some environments a network endpoint (e.g., a computer, server, sensor, etc.) is directly connected to the network through an endpoint connector, such as that found in a network patch panel, wall jack, or floor box. Such a connector may be a remotely cabled extension of a port in a switching device or other network device in the network. The network cable infrastructure may run behind walls, above drop ceiling tiles, under floors or concrete slabs, or through conduit. Viewing the actual cable path and determining where it is physically connected are often difficult. Documentation identifying a remote wall jack that connects to a particular switch and switch port may be inaccurate or non-existent. Some environments experience rapid port change requests, so that adequately tracking the configuration of network services to network ports is difficult. These issues are sometimes seen in large-scale conference venues, hotels, stadiums, schools, office buildings and other environments where a network endpoint, physical cabling and their connection to a network device are not readily visible.

DESCRIPTION OF EXAMPLE EMBODIMENTS

Overview

Embodiments are presented herein for associating an endpoint connection with a port to which it is connected, and for allowing configuration of the port. A notification is received from a network device. The notification includes an identifier of a provisioning trigger device connected to an endpoint connection that is in communication with a port of the network device. The notification further includes an identifier of a port of the network device. Configuration information is sent to the network device, wherein the configuration information specifies how the network device is to configure the port for networking services.

Example Embodiments

In a network environment, network services (data rate, quality of service, etc.) are configured of network devices (e.g., switches, routers, etc.) in the network for users that connect to the network by way of an endpoint connection (network jack, panel, etc.). At least some of these requirements can be met by properly configuring the port of a network device to which the endpoint connection is connected. These requirements can change from time-to-time. It is therefore helpful to associate the endpoint connection (and its requirements) with the port to which it connects. This would allow the proper configuration of the port on the network device to which the endpoint connection is connected. If this association is not known because of poor documentation, previous network changes or remote extension of the port, for example, then the configuration may be done at the wrong port, if it is possible to make the configuration at all.

A conference venue, for example, may have a large space with endpoint connections in floor boxes embedded in the concrete floor. These floor boxes have cabling run back to wiring closets; each floor box may be connected to a switch (and to a particular switch port) in one of the wiring closets. Depending on the size of the conference space there may be multiple wiring closets, multiple switches in a given wiring closet, and multiple ports on each switch. Conference venues may undergo rapid set-up and tear-down of the network environment in support of numerous successive events hosted at the facility. The conference venue's customer (e.g., an exhibitor) may order a certain type of network service, e.g. 10 Mbps bandwidth to the Internet. The conference venue must appropriately configure the switch port that serves the correct floor box closest to the exhibitor's booth. Determining the correct switch and switch port can be problematic in a large environment, as discussed above. Documentation of current connectivity may be inaccurate or non-existent. As a result, it becomes difficult to provide the required service to a customer, given the uncertainty as to the appropriate port to configure.

Figure 1:
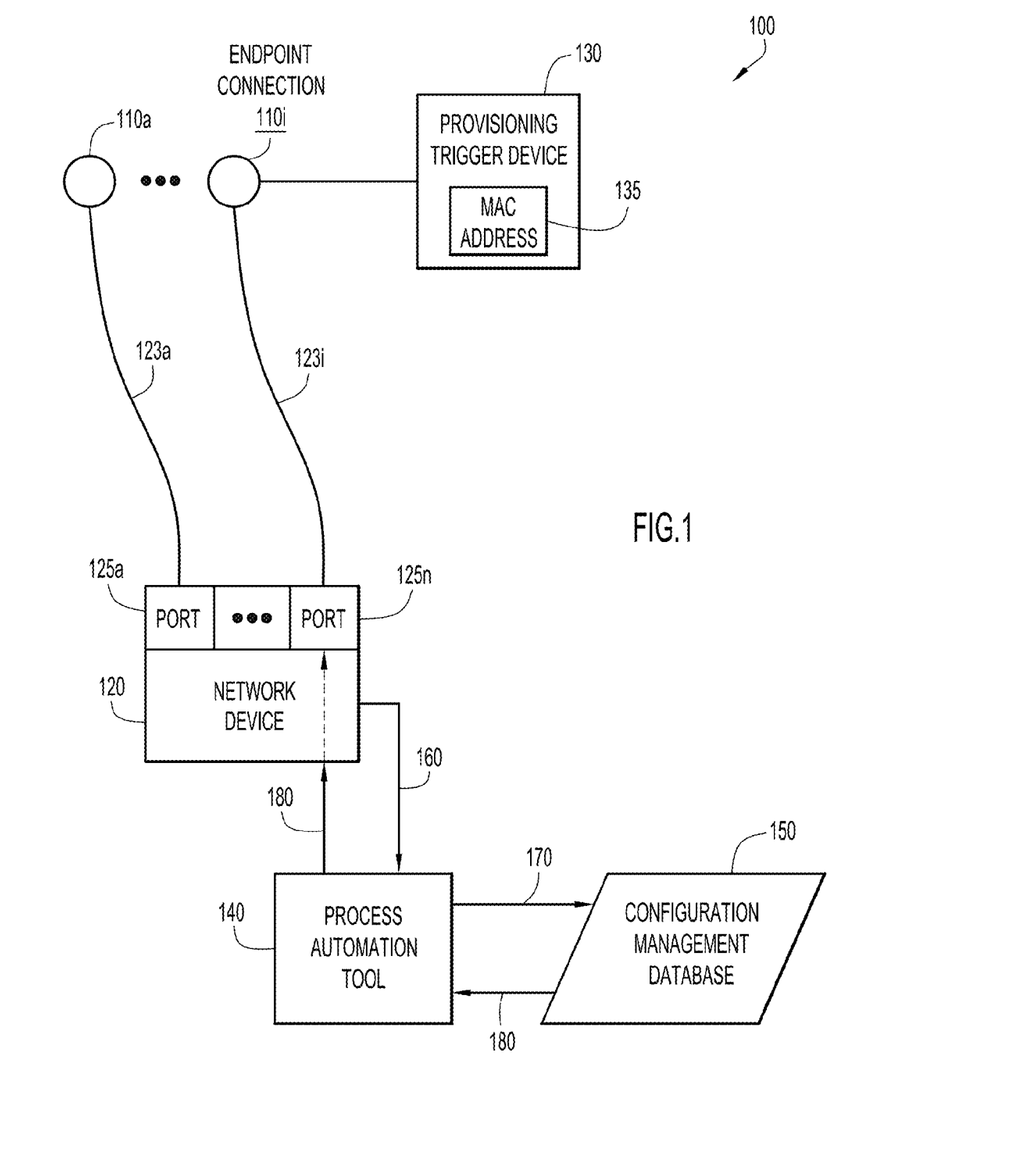
FIG. 1 illustrates a system as described herein according to an example embodiment.

FIG. 1 illustrates a system described herein, according to an example embodiment. In a network, one or more endpoint connections 110a-110i are connected to a network device 120. The network device 120 may be a switch, router, gateway device, etc., for example and without limitation. Each of the endpoint connections 110 may supply communications and power to a user, and serves as a point at which the user may connect an endpoint device, such as a computing device, to a network. Each of the endpoint connections 110 may be an Ethernet jack incorporated in a patch panel, wall jack, or floor box, for example. Each of the endpoint connections 110 is connected to network device 120 at a port of network device 120 through a communications medium 123, such as a fiber or electrical cable. In the illustrated example, endpoint connection 110i is connected to network device 120. The network device 120 may have several ports. In the illustrated embodiment, network device 120 is configured with ports 125a, . . . 125n.

In this example, endpoint connection 110i is connected to port 125n. As discussed above, however, it may be difficult for network management personnel to identify the port connected to endpoint connection 110i. To address this, a provisioning trigger device 130 may be attached to endpoint connection 110i. The provisioning trigger device 130 has a known unique identifier, such as a network address. In an embodiment, this address is a media access control (MAC) address, shown here as MAC address 135. The MAC address 135 is provided by provisioning trigger device 130 to network device 120. The provisioning trigger device 130 may be any device having a unique identifier (e.g., a network address) and capable of communicating with network device

120 via endpoint connection 110*i*. In an embodiment, provisioning trigger device 130 may be a programmable computing and communications device, and may be a commercially available device such as a laptop computer, or may be a custom device. It is to be understood that the provisioning trigger device 130 may be implemented in any of a number of ways, as would be understood by a person of ordinary skill in the art. Generally, the provisioning trigger device 130 is a device that has a unique identifier and can connect to a network (e.g., using the Ethernet protocol) and send standard networking messages into a network, which messages include an identifier of the provisioning trigger device 130.

Network device 120 recognizes the port at which the MAC address 135 is received, in this case port 125*n*. Network device 120 generates a notification 160 that is sent to a process automation tool 140. The notification 160 indicates the network device that is sending the notification 160, and the notification 160 includes the identifier of the provisioning trigger device, e.g., MAC address 135. In an embodiment, the notification 160 may also include an identifier of port 125*n*. For example, the notification 160 may be a standard network message that indicates the source network device (e.g., Switch-27), and including MAC address: 0022:bdcf:4934, and Interface: GigabitEthernet 0/7. The process automation tool 140 then sends a query 170 to a configuration management database 150. The query 170 includes the MAC address 135. In an embodiment, the query 170 may also include identifiers of the network device 120 and of switch port 125*n*. The query 170 is sent to the configuration management database 150 to obtain the configuration information necessary to configure the appropriate port (in this case, port 125*n*) of the network device 120.

A configuration management database 150 stores network services configuration information required at one or more ports. The configuration information may be stored and accessed according to a network address of the provisioning trigger device connected to an endpoint connection. If a user is to use a particular endpoint connection, such as endpoint connection 110*i*, the user's requirements determine the necessary configuration for networking services of the network device port to which endpoint connection 110*i* is connected. The information specifying this configuration, i.e., the configuration information, is associated with the MAC address 135 of the provisioning trigger device 130. The association of MAC address 135 to configuration information for network services is stored in the configuration management database 150. In an embodiment, the configuration information may be retrieved from configuration management database 150 on the basis of the identifier of the provisioning trigger device, e.g., MAC address 135. Thus, the configuration management database 150 determines whether there is a pending configuration to be made based on the identifier of the provisioning trigger device.

In response to the query 170, and if there is a pending configuration to be made based on the identifier contained in the query, the configuration management database 150 provides configuration information 180 to the process automation tool 140. This configuration information 180 may be retrieved at the configuration management database 150 on the basis of the provisioning trigger device identifier in notification 160 and in query 170. For example, based on the query 170, it may be determined the "Provisioning Trigger Device 130*a*" is associated with order for User/Customer 1 (e.g., a Trade Show A), requiring 10 Mbps, VLAN 10, Port Description X, QoS Policies Y & Z, a particular duplex requirement, and particular security parameters. In other embodiments, other port configuration options may be specified instead of or in addition to these; this list is meant as an example and should not be construed as limiting. The configuration information 180 is then provided to network device 120 and is used for the configuration of the identified port 125*n*. The result is the appropriately configured port 125*n*, where the configuration may be specific to the requirements of the user of endpoint connection 110*i*.

The configuration information, as specified or requested by the user and stored by the configuration management database, may include a variety of information. The configuration information may include one or more of a data rate, a duplex specification, a virtual local area network (VLAN) identifier, a port description, a quality of service (QoS), and security parameters. These are to be understood as examples, without limitation.

Moreover, the configuration information may be stored in the configuration management database 150 once it is specified by the user of the endpoint connection. The configuration information represents the requirements of the user as expressed in his order for network services. In some situations, the configuration information may also include configuration specifications mandated by the service provider, such as security parameters, rate limitations, and/or broadcast controls. The configuration information for an endpoint connection therefore represents an order entry. As noted above, the configuration information (e.g., the order entries) may be organized according to a network address of the provisioning trigger device connected to the endpoint connection. In an embodiment, the network address is part of the related order entry.

A network administrator will associate a particular provisioning trigger device for configuring the network services for a particular user, and in so doing, associate the MAC address (or other identifier) of the provisioning trigger device with the order entry for that user. At any point in time, there may be multiple "orders" outstanding and stored in the configuration management database 150 for network services for a particular user (at a network connection), each order associated with a different unique identifier of a provisioning trigger device. The configuration information may be indexed in the configuration management database 150 according to the unique identifier of the provisioning trigger device at the endpoint connection. Multiple such provisioning trigger devices, each with a different unique identifier, can be used to configure respective endpoint connections. Once the endpoint connection is configured in the manner described herein, the unique identifier for the provisioning trigger device may be re-used for a different user and user order (and endpoint connection). In the database 150, multiple configuration orders (with the same or different customers) associated with the same provisioning trigger device may be queued sequentially.

While FIG. 1 illustrates a single network device, it should be understood that this illustration is presented as an example, and that other configurations are possible. In most network environments, there are numerous switches, routers, etc. Moreover, it may be unclear at the outset which network device is connected to a given endpoint connection, and indeed it is not necessary to know this when the network configuration techniques presented herein are used. The identities of both the network device, as well as the port at that network device, are needed in this case in order to properly configure the correct port. In such a situation, each network device may have its own respective process automation tool; the process automation tools may then be in communication with a centralized configuration management database. A network device may then receive a network address as discussed above and provide a notification to its process automation tool, which then obtains the appropriate configuration information for the port at which the address was received. This arrangement, where each network device has its own process automation tool, would be useful for reasons of scale, if there is a large number of switches and ports for example.

Alternatively, two or more network devices may share a process automation tool. In this case, again, the process automation tool will be in communication with a configuration management database. A network device may then receive a network address as before and provide a notification to its process automation tool, which then obtains the appropriate configuration information for the network device port at which the address was received.

Figure 2:
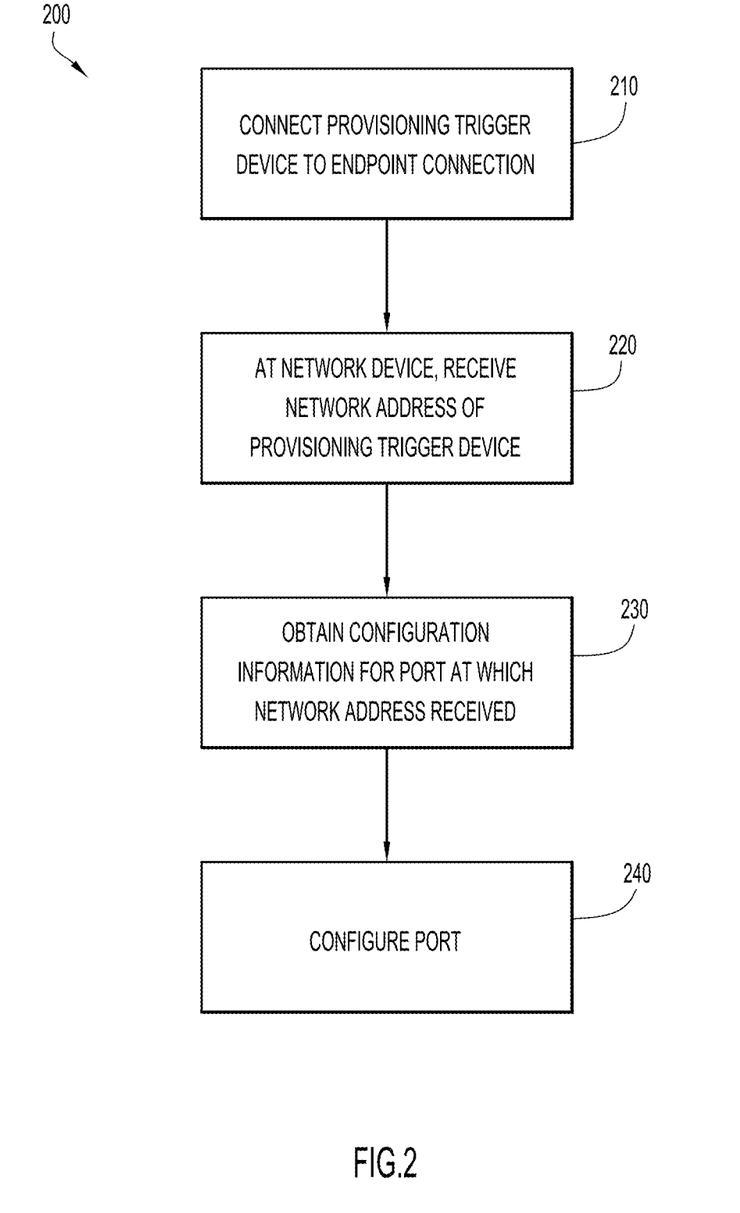
FIG. 2 is a flowchart illustrating the processing described herein according to an example embodiment.

The process above is illustrated generally in the flowchart of FIG. 2, according to an embodiment. At 210, a provisioning trigger device is attached to an endpoint connection by way of a network cable, for example. As discussed above, the provisioning trigger device has an identifier that may be in the form of a network address, such as a MAC address. At 220, the network address of the provisioning trigger device is received at a network device. At 230, configuration information is obtained by the network device, where the configuration information allows configuration of the network device port with which the endpoint connection is in communication (i.e., the port at which the network address was received). As described above, the configuration information may be stored in a configuration management database. The configuration information may be indexed in the database according to the network address of the provisioning trigger device at the endpoint connection. The configuration information corresponds to a user's requirements for connection at the endpoint connection. As noted above, the configuration information may also include requirements specified by the service provider. At 240, the port is configured according to the configuration information.

Figure 3:
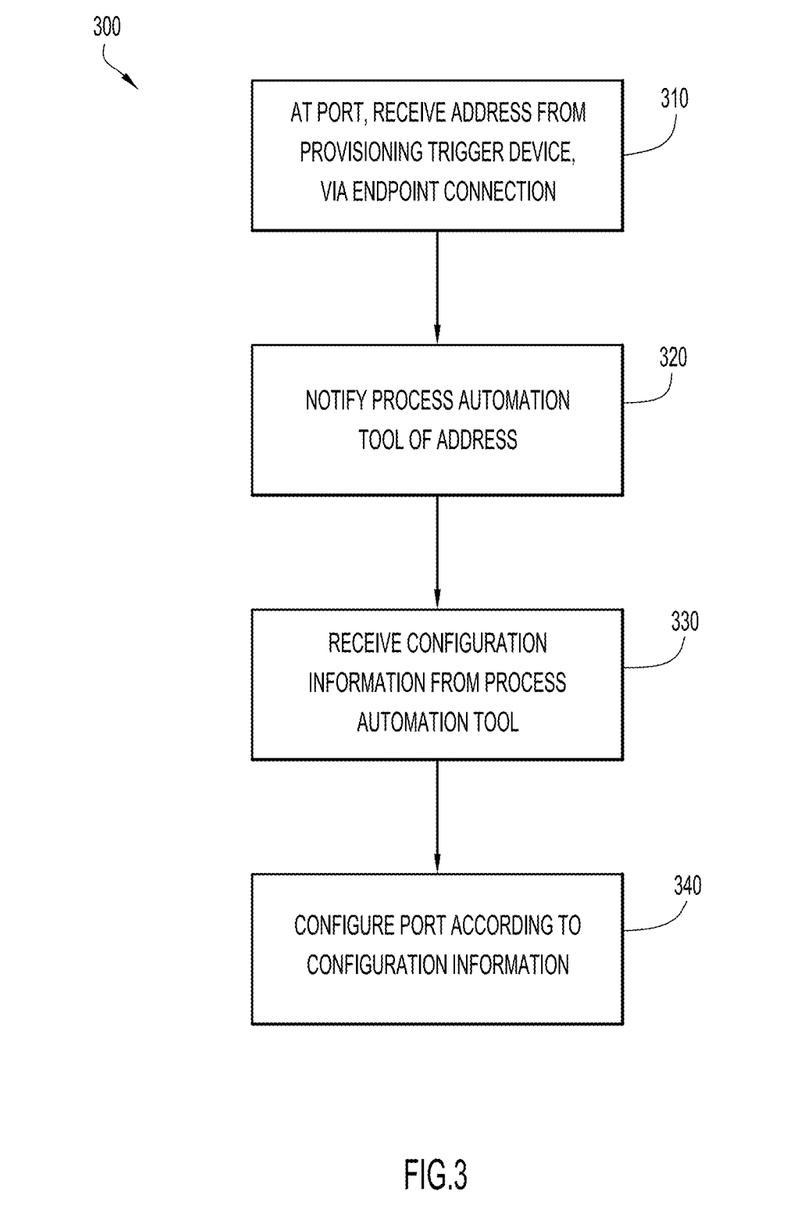
FIG. 3 is a flowchart illustrating operations performed at a network device, according to an example embodiment.

Operations at a network device are illustrated in FIG. 3, according to an embodiment. At 310, the network address of a provisioning trigger device at an endpoint connection is received when the provisioning trigger device is connected to an endpoint connection. The network address is received at a port of the network device. In an embodiment where the network device is a switch, for example, the port would be a switch port. At 320, the network device notifies a process automation tool of the network address. In another embodiment, an identifier of the port may also be provided. At 330, the network device receives configuration information from the process automation tool. As noted above, the configuration information may be stored in a configuration management database where it is retrieved by the process automation tool based on the address of the provisioning trigger device. At 340, the port may be configured according to the received configuration information.

Figure 4:
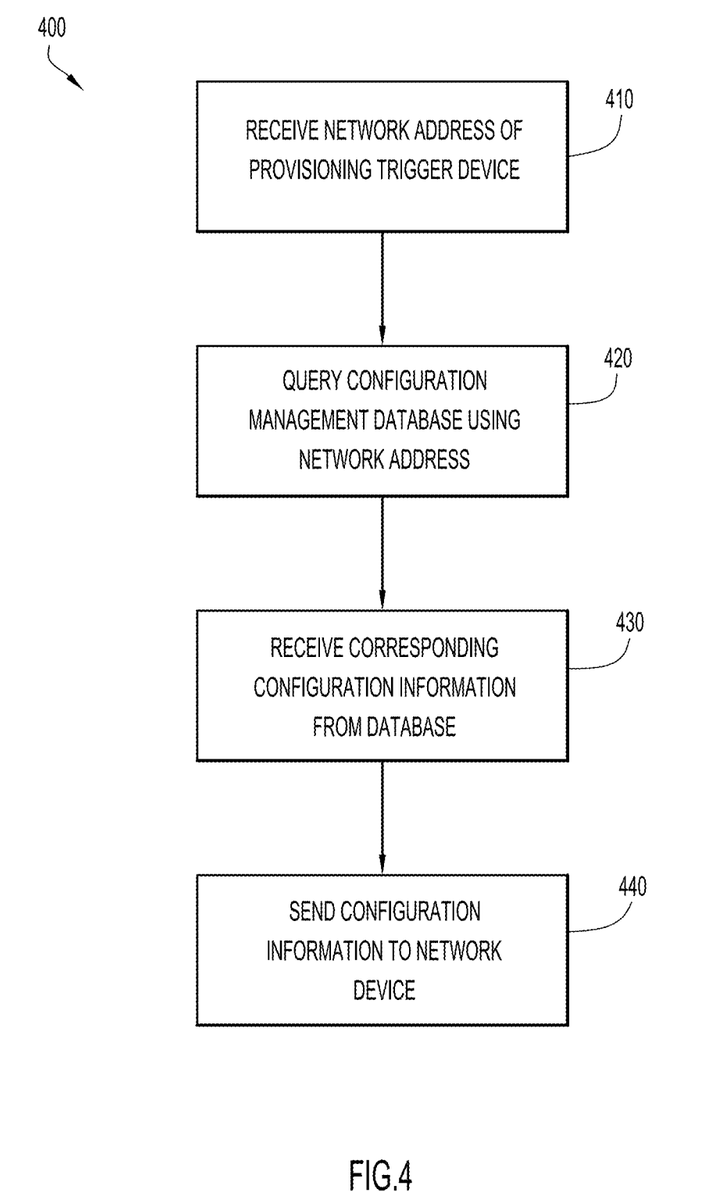
FIG. 4 is a flowchart illustrating operations performed at a process automation tool, according to an example embodiment.

Operations performed by the process automation tool are illustrated in FIG. 4, according to an embodiment. At 410, the process automation tool receives a notification from the network device, where the notification includes the address of a provisioning trigger device. The network address may be received at the process automation tool from a network device in communication with the provisioning trigger device. At 420, a configuration management database is queried to obtain configuration information. The query includes the network address of the provisioning trigger device. As discussed above, the configuration management device may store configuration information indexed by the network address of the provisioning trigger device. This allows the process automation tool to retrieve the configuration information associated with this network address at 430. At 440, the process automation tool sends the configuration information as described above to the network device, where it may be used to configure the port at which the network address had been received (see 310 of FIG. 3).

Figure 5:
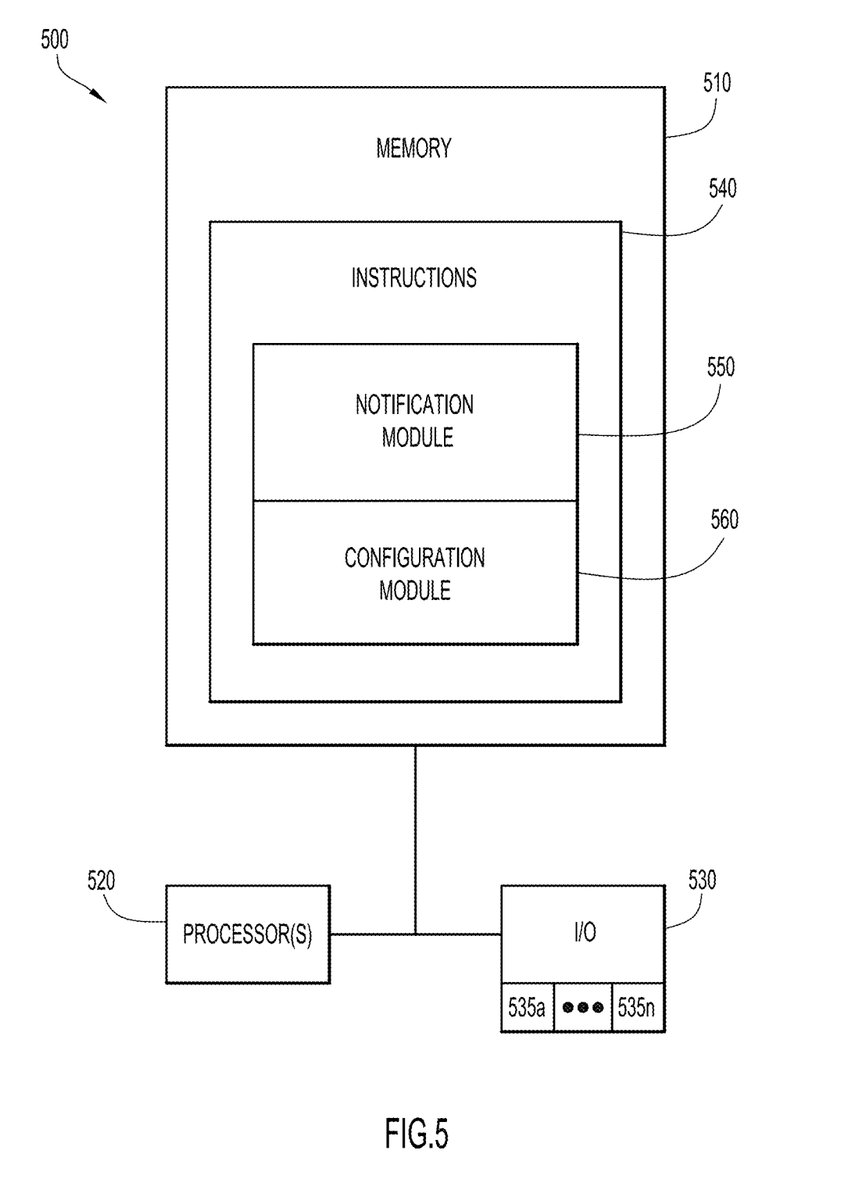
FIG. 5 is a block diagram illustrating a computing environment for a software or firmware implementation of logic in a network device, according to an example embodiment.

In an embodiment, the operations described above for the network device may be implemented in one or more programmable processors executing software or firmware (or a combination thereof). A software or firmware embodiment of these operations is illustrated in FIG. 5. A network device may be viewed as a computing system 500, which includes one or more memory devices, shown collectively as memory 510. Memory 510 is in communication with one or more processors 520 and with one or more input/output (I/O) units 530. The I/O 530 may include one or more Application Specific Integrated Circuits (ASICs) that are configured with digital logic gates to perform various networking and security functions. An example of an I/O unit is a network processor unit that may have associated ports 535a-535n. In an embodiment, I/O 530 and one or more of ports 535a-535n allow communications with endpoints via respective endpoint connections. For example, as discussed above, a provisioning trigger device may be connected to an endpoint connection and provide its network address to the network device via the endpoint connection; at the network device, the network address may be received at one of the ports 535a-535n. Moreover, communications between the network device and a process automation tool may also take place via I/O 530 and one or more of ports 535a-535n.

Memory 510 may comprise, but is not limited to comprising, read only memory (ROM), random access memory (RAM), magnetic disk storage media devices, optical storage media devices, flash memory devices, electrical, optical, or other physically tangible (i.e., non-transitory) memory storage devices. Memory 510 stores data as well as executable instructions 540. Instructions 540 are executable on processor(s) 520. The processor(s) 520 comprise, for example, a microprocessor or microcontroller that executes instructions 540. Thus, in general, the memory 510 may comprise one or more tangible (non-transitory) computer readable storage media (e.g., memory device(s)) encoded with software or firmware that comprises computer executable instructions. When the instructions are executed (by the processor(s) 520) the software or firmware is operable to perform the operations described herein.

In the illustrated embodiment, the executable instructions 540 may include several logic modules. These may include a notification module 550 responsible for constructing and sending a notification to a process automation tool, where the notification includes a network address of the provisioning trigger device in communication with the network device. In an embodiment, the notification may also include an identifier of the port of the network device at which the network address is initially received from the provisioning trigger device. The executable instructions 540 may also include a configuration module 560 responsible for receiving configuration information from the process automation tool, and using this information to configure the port with which the provisioning trigger device is in communication.

Figure 6:
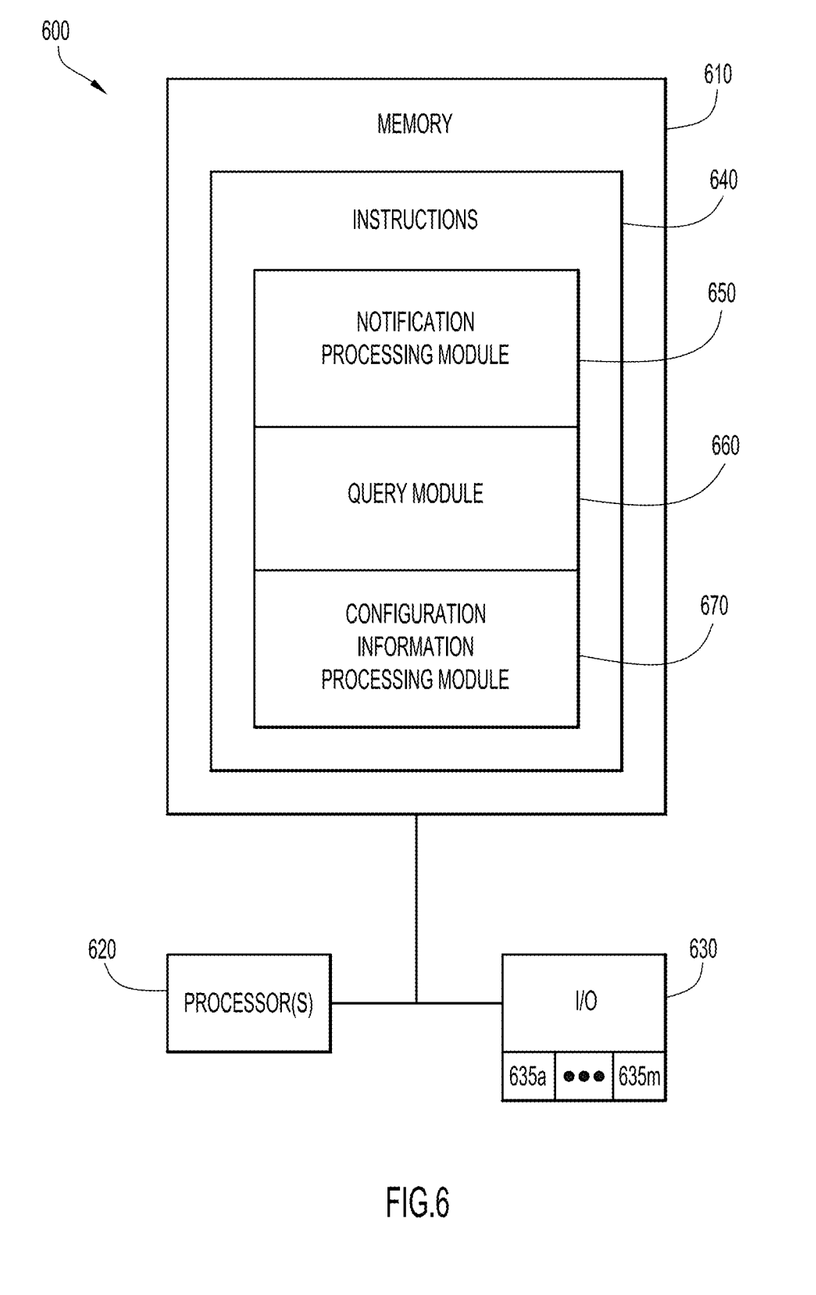
FIG. 6 is a block diagram illustrating a computing environment for a software or firmware implementation of logic in a process automation tool, according to an example embodiment.

In an embodiment, the operations described above for the process automation tool may also be implemented in one or more programmable processors executing software or firmware (or a combination thereof). A software or firmware embodiment of these operations is illustrated in FIG. 6. A process automation tool may be viewed as a computing system 600, which includes one or more memory devices, shown collectively as memory 610. Memory 610 is in communication with one or more processors 620 and with one or more I/O units 630. The I/O 630 may include one or more ASICs that are configured with digital logic gates to perform various networking and security functions. An example of an I/O unit is a network interface unit (e.g., network interface card) that has associated ports 635a-635m. In an embodiment, I/O 630 and one or more of ports 635a-635m allow network communications, e.g., with a network device and with a configuration management database. For example, notifications may be received from a network device through one of ports 635a-635m; queries may be sent from the process automation tool to a configuration management database through one of these ports. Moreover, configuration information may be received from the configuration management database through one of ports 635a-635m, and sent to the network device through one of these ports.

Memory 610 may comprise, but is not limited to comprising, ROM, RAM, magnetic disk storage media devices, optical storage media devices, flash memory devices, electrical, optical, or other physically tangible (i.e., non-transitory) memory storage devices. Memory 610 stores data as well as executable instructions 640. Instructions 640 are executable on processor(s) 620. The processor(s) 620 comprise, for example, a microprocessor or microcontroller that executes instructions 640. Thus, in general, the memory 610 may comprise one or more tangible (non-transitory) computer readable storage media (e.g., memory device(s)) encoded with software or firmware that comprises computer executable instructions. When the instructions are executed (by the processor(s) 620) the software or firmware is operable to perform the operations described herein.

In the illustrated embodiment, the executable instructions 640 may include several logic modules. These may include a notification processing module 650. This module may be responsible for receiving and processing notifications from a network device. Instructions 640 may also include a query module 660, which may be responsible for formulating and sending queries to, and receiving query responses from, a configuration management database. Instructions 640 may further include a configuration information processing module 670, which may be responsible for receiving configuration information from the configuration management database and sending this information to the network device. As described above, the configuration information may represent the requirements of the user and may also include configuration specifications mandated by the service provider, such as security parameters, rate limitations, and/or broadcast controls.

Figure 7:
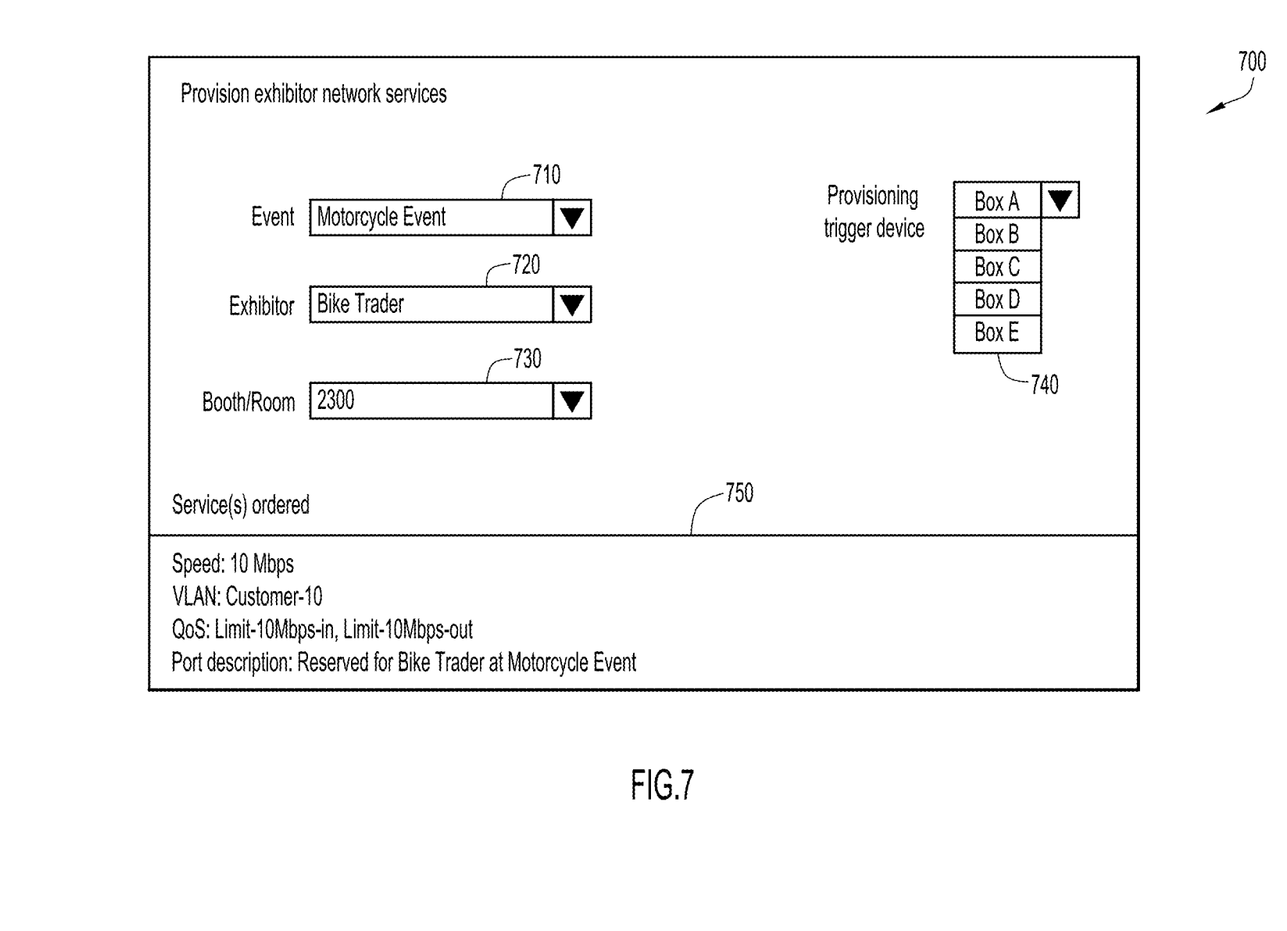
FIG. 7 is a provisioning portal interface for a network administrator, according to an example embodiment.

FIG. 7 illustrates an embodiment of a user interface 700, via which a network administrator may specify the network services needed for the endpoint connection at which a user is located. A network administrator may actually complete the fields shown in FIG. 7 for a user as part of an order for network services to be provisioned for the user. In this example, the user is an exhibitor at a trade show. The network administrator may specify the event ("Motorcycle Event") in field 710 and may specify the user's company ("Bike Trader") in field 720. The network administrator may also specify the booth or room that the user will be using ("2300") in field 730. In field 740, the network administrator may specify a designator (generic identifier) for the particular provisioning trigger device to be used ("Box A") for provisioning network services for a particular order (for the user). In field 750, the network services for the user may be specified. In this case, the user has requested a data rate of 10 megabits per second (Mbps). He has also requested a particular VLAN and a desired quality of service (10 Mbps in, 10 Mbps out). The user has also specified a port description that, in this case, identifies his company.

In an embodiment, each provisioning trigger device (Box A, Box B, . . . ) may be connected to a particular port at a network device via an endpoint connection. Other endpoint connections may have other respective provisioning trigger devices connected to them at any given time for purposes of provisioning network services to other users. As discussed above, each such provisioning trigger device will have its own unique identifier for transmission to the network device.

The network services specified in field 750 may be saved through user interface 700 as configuration information for storage in the configuration management database. As described above, the identifier of the provisioning trigger device may also be stored in this database, such that the identifier can be used to access the configuration information. The configuration information can then be used to configure the network device port at which the identifier of the provisioning trigger device was received.

A separate portal may be provided for the user to enter a network services request ("I want 10 Mbps Ethernet for my booth"). The network administrator(s) use a provisioning portal/page like that shown in FIG. 7, which allows them to select the user (e.g., exhibitor/customer) they are working on, pick the booth (if the customer/vendor has multiple booths), and then identify the provisioning trigger device to associate to the order, and which will be used to connect to the endpoint connection where the user needs network services.

The back-end process automation tool (140 as shown in FIG. 1) then builds a network switch port configuration ('configlet') that reflects the customer's Ethernet request and supplements it with other parameters that the service provider (network administrator) may deem necessary, like VLAN, port description, security parameters, etc.

In summary, in one form, a method is provided comprising receiving a notification from a network device, the notification including an identifier (e.g., an address) of a provisioning trigger device connected to an endpoint connection in communication with a port of the network device, and the notification further including an identifier of a port of the network device. The method further comprises sending configuration information to the network device, wherein the configuration information specifies how the network device is to configure the port for networking services.

In another form, one or more non-transitory computer readable storage media are provided encoded with software comprising computer executable instructions that, when executed, are operable to receive a notification from a network device, the notification including an identifier (e.g., an address) of a provisioning trigger device connected to an endpoint connection in communication with a port of the network device, and the notification further including an identifier of a port of the network device. The instructions, when executed, are further operable to send configuration information to the network device, wherein the configuration information specifies how the network device is to configure the port for networking services.

In still another form, an apparatus is provided that comprises a network interface unit configured to enable network communication, and at least one processor. The processor is configured to receive a notification from a network device, the notification including an identifier (e.g., an address) of a provisioning trigger device connected to an endpoint connection in communication with a port of the network device, and the notification further including an identifier of a port of the network device. The processor is configured to send configuration information to the network device, wherein the configuration information specifies how the network device is to configure the port for networking services.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
receiving, at a process automation tool disposed between a network device of a network and a configuration management database of the network, a notification from the network device including an identifier of a port of the network device and an identifier of a provisioning trigger device connected to an endpoint connection that is connected to the port of the network device, wherein the endpoint connection provides the provisioning trigger device with network connectivity to the network so that the provisioning trigger device can send messages into the network;
transmitting a query to the configuration management database, the query including the identifier of the port of the network device and the identifier of the provisioning trigger device, wherein the identifier of the provisioning trigger device is used to locate an entry in the configuration management database to retrieve the configuration information that specifies how the network device is to configure the port for networking services;
receiving the configuration information; and
sending the configuration information to the network device.

2. The method of claim 1, wherein the configuration information is based at least in part on networking services desired by a user of the port.

3. The method of claim 1, wherein the query further includes an identifier of the network device.

4. The method of claim 1, wherein the configuration management database stores one or more order entries, and each order entry of the one or more order entries includes a particular identifier for a particular provisioning trigger device selected from a plurality of provisioning trigger devices and particular configuration information for the particular provisioning trigger device.

5. The method of claim 1, wherein
the entry in the configuration management database for the configuration information includes information identifying a venue where the provisioning trigger device is used.

6. The method of claim 1, wherein the identifier of the provisioning trigger device is a media access control (MAC) address.

7. The method of claim 1, wherein the configuration information comprises one or more of:
a data rate,
a duplex specification,
a virtual local area network (VLAN) identifier,
a port description, or
a quality of service.

8. One or more computer readable non-transitory storage media encoded with software comprising computer executable instructions that, when executed, are operable to:
receive a notification from a network device including an identifier of a port of the network device and an identifier of a provisioning trigger device connected to an endpoint connection that is connected to the port of the network device, wherein the endpoint connection provides the provisioning trigger device with network connectivity to a network provided by the network device so that the provisioning trigger device can send messages into the network;
transmit a query to a configuration management database, the query including the identifier of the port of the network device and the identifier of the provisioning trigger device, wherein the identifier of the provisioning trigger device is used to locate an entry in the configuration management database to retrieve the configuration information that specifies how the network device is to configure the port for networking services;
receive the configuration information; and
send the configuration information to the network device.

9. The computer readable storage media of claim 8, wherein the configuration information is based at least in part on networking services desired by a user of the port.

10. The computer readable storage media of claim 8, wherein the configuration management database stores one or more order entries, and each order entry of the one or more order entries includes a particular identifier for a particular provisioning trigger device selected from a plurality of provisioning trigger devices and particular configuration information for the particular provisioning trigger device.

11. The computer readable storage media of claim 8, wherein the query further includes an identifier of the network device.

12. The computer readable storage media of claim 8, wherein
the entry in the configuration management database for the configuration information includes information identifying a venue where the provisioning trigger device is used.

13. The computer readable storage media of claim 8, wherein the identifier of the provisioning trigger device is a media access control (MAC) address.

14. The computer readable storage media of claim 8, wherein the configuration information comprises one or more of:
a data rate,
a duplex specification,
a virtual local area network (VLAN) identifier,
a port description, or
a quality of service.

15. An apparatus comprising:
a network interface unit configured to enable network communications to a network;
a processor coupled to the network interface unit, and configured to:
receive a notification from a network device including an identifier of a port of the network device and an identifier of a provisioning trigger device connected to an endpoint connection that is connected to the port of the network device, wherein the endpoint connection provides the provisioning trigger device with network connectivity to a network provided by the network device so that the provisioning trigger device can send messages into the network;

transmit a query to a configuration management database, the query including the identifier of the port of the network device and the identifier of the provisioning trigger device, wherein the identifier of the provisioning trigger device is used to locate an entry in the configuration management database to retrieve the configuration information that specifies how the network device is to configure the port for networking services;

receive the configuration information; and send the configuration information to the network device.

16. The apparatus of claim 15, wherein the configuration information is based at least in part on networking services desired by a user of the port.

17. The apparatus of claim 15, wherein the query further includes an identifier of the network device.

18. The apparatus of claim 15, wherein
the entry in the configuration management database for the configuration information includes information identifying a venue where the provisioning trigger device is used.

19. The apparatus of claim 15, wherein the identifier of the provisioning trigger device is a media access control (MAC) address.

20. The apparatus of claim 15, wherein the configuration information comprises one or more of:
a data rate,
a duplex specification,
a virtual local area network (VLAN) identifier,
a port description, or
a quality of service.

\* \* \* \* \*